United States Patent [19]

Freulon

[11] Patent Number: 4,779,572
[45] Date of Patent: Oct. 25, 1988

[54] APPARATUS FOR TAKING CARE OF THE COAT OF ANIMALS

[76] Inventor: Claude Freulon, 27, rue Henri Lafosse, 76000 Rouen, France

[21] Appl. No.: 24,784

[22] Filed: Mar. 11, 1987

[30] Foreign Application Priority Data

Mar. 11, 1986 [FR] France ............................... 86 03715

[51] Int. Cl.⁴ ............................................. A01K 13/00
[52] U.S. Cl. ..................................... 119/85; 119/159; 132/112; 401/190; 401/285
[58] Field of Search ........................... 119/83, 85, 159; 132/112, 116; 401/123, 138, 139, 190, 266, 285, 289, 290

[56] References Cited

U.S. PATENT DOCUMENTS

| | | | |
|---|---|---|---|
| 2,648,867 | 8/1953 | Erling . | |
| 3,209,386 | 10/1965 | Weber | 132/120 X |
| 3,308,500 | 3/1967 | Woodruff | 119/85 X |
| 3,332,102 | 7/1967 | Brinker | 401/285 X |
| 3,406,694 | 10/1968 | Odence | 401/190 X |
| 3,626,546 | 12/1971 | Dove | 119/85 X |
| 3,714,950 | 2/1973 | Miska et al. | 132/112 |
| 3,964,501 | 6/1976 | Matchett | 132/11 A |
| 4,376,441 | 3/1983 | Duncan | 132/9 |
| 4,485,583 | 12/1984 | Planty | 43/139 |
| 4,557,619 | 12/1985 | DeVincentis | 132/112 X |

FOREIGN PATENT DOCUMENTS 1536475 7/1968 France .
2277546 2/1976 France .

*Primary Examiner*—Robert P. Swiatek
*Attorney, Agent, or Firm*—Wenderoth, Lind & Ponack

[57] ABSTRACT

A hollow housing has a handle for connecting the housing to a suction device. The housing has a suction chamber and a comb, and further may include second and third chambers. A distributor tube is disposed in the third chamber for spraying product through the second chamber that is open in the direction of the comb for spraying the treating product toward the comb. One of the ends of the distributor tube is connected to a container of treating product under pressure which can be manually actuated by the user.

10 Claims, 2 Drawing Sheets

APPARATUS FOR TAKING CARE OF THE COAT OF ANIMALS

BACKGROUND OF THE INVENTION

The present invention relates to an apparatus for taking care of the coat or fur of animals, and including a housing having an approximately rectangular section, a connector acting as a handle for connection to a suction device, a suction chamber and a comb.

Few apparatus exist in the art for effecting treatments on the coat or fur of animals. Combs are known having some hollow teeth whereby it is possible to blow treating products onto the coat. Driers are also known which inject lukewarm air into the coat and are combined with a hair-gathering device. For the hair of human beings, French Pat. No. 1,536,475 discloses a comb associated with a suction case.

The major drawback of apparatus for treating the coat of animals resides in the fact that the chamber in which the treatment is effected becomes charged with dust, hairs or treating products with the resulting risk of allergy of the respiratory tracts of the animals. Further, if it is desired to effect a complete treatment, several successive operations must be carried out.

SUMMARY OF THE INVENTION

An object of the invention is therefore to solve these problems by providing an apparatus whereby it is possible to effect a treatment in a single operation and which is simple and inexpensive.

The invention provides for this purpose an apparatus for taking care of the coat of animals, comprising a hollow housing, a connector acting as a handle for connection to a suction device, a first suction chamber and a comb, wherein the housing is partitioned and includes, in addition to the suction chamber, a second chamber and a third chamber in which is disposed a device for distributing treating product through the second chamber in the direction of the comb.

According to an embodiment of the invention, the treating product distributing device is constituted by a spraying device adapted to spray the treating product toward the comb, in front of the latter, and into the stream of aspirated air.

In this case, the spraying device inserted in the third chamber will comprise for example a distributor tube provided with orifices calibrated in accordance with the product to be sprayed, one end of this tube being closed and the other end being connected to a container containing the product under pressure which is provided with a valve and is disposed in the third chamber located in the vicinity of the handle of the apparatus to enable the user to act on the bottom of the container during the treatment and operate the valve and send into the distributor tube the desired amount of treating product. The orifices of the distributor tube will be oriented toward the comb through an opening provided in the housing in the region of the second chamber. The suction chamber, located on the other side of the comb, will have its orifices located behind the latter and on each side of at least one brush for finishing the treatment by removing the excess treating product and detached hairs, dust and foreign bodies, by sleeking the coat or fur and thus permitting an improved penetration of the remaining product in the coat.

According to another embodiment, the distributing device comprises a cartridge or canister of treating product, for example in the form of powder in which are provided a number of product-distributing openings.

According to the type of coat to be treated and as a function in particular of the thickness and dimension of the hairs, the comb and brush must be adapted thereto, and consequently they will be removable, for example by sliding them longitudinally in slideways provided for this purpose in the body of the housing which is made of a strong plastics material. The housing further comprises a boss located under the handle and in front of the brush and comb to permit the laying of the apparatus on the coat during the caring operations, while avoiding an excessive penetration of the comb, and produce a sort of massage.

If it is not desired to spray a product or use a powdered product, it is also possible to use treating products in the form of a solidified gel.

For this purpose, it is arranged to insert in the third chamber, in the vicinity of the outlet opening to the second chamber provided for the sprayed jet, the pieces of gel, or to use this chamber for inserting therein a cartridge of solidified gel of treating product, the molecules contained in the gel being diffused under the effect of the suction.

The apparatus according to the invention has the following advantages:

It is possible to effect in a single operation the treatment by means of a product, the combing, the suction and the brushing of the hairs, and consequently saving time. It also avoids polluting the surrounding air. It permits the application of all kinds of products and in particular dry shampoos, insecticides, products for treating the skin, etc.

It is also very well supported by the animals and, owing to its facility of use, it permits more frequent and more rapid treatments.

BRIEF DESCRIPTION OF THE DRAWINGS

A better understanding of the invention will be had from the following description which is given solely by way of example with reference to the accompanying drawings, in which.

DETAILED DESCRIPTION OF THE INVENTION

Figure 1:
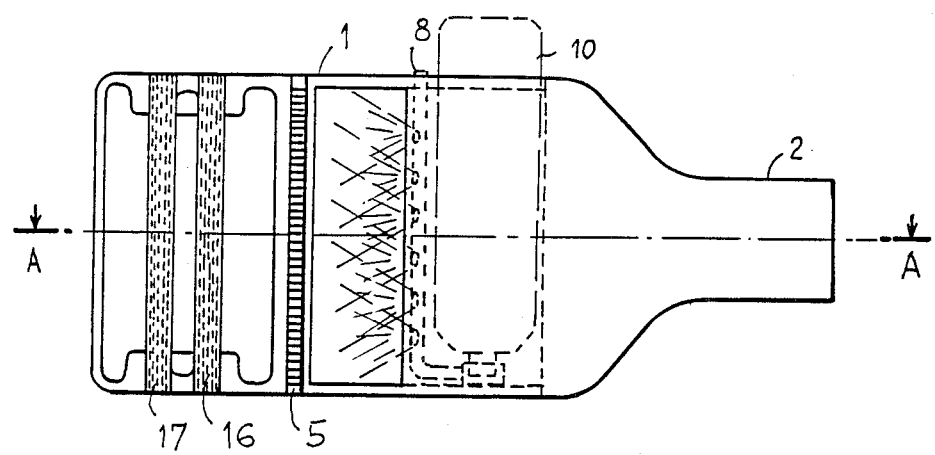
FIG. 1 is a top plan view of a first embodiment of an apparatus according to the invention.
Figure 2:
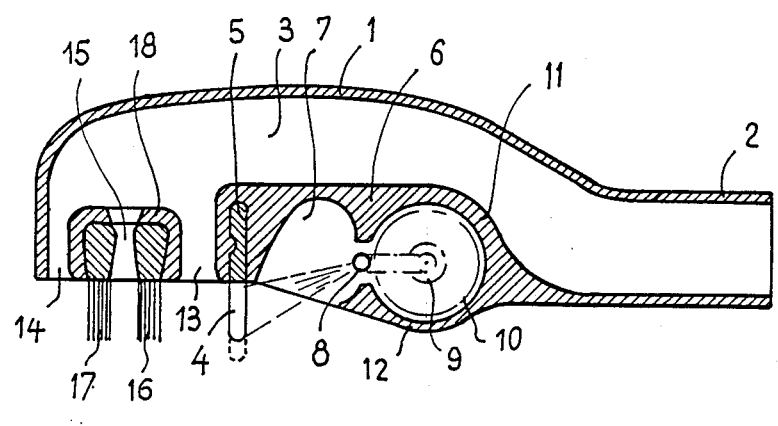
FIG. 2 is a sectional view taken on line A—A of FIG. 1.

As can be seen in FIGS. 1 and 2, the apparatus according to the invention comprises a hollow housing 1 having an approximately rectangular section and terminating in a tubular handle 2 for connecting the apparatus to a flexible hose of a suction device. It further comprises a first suction chamber 3 and a comb 4 which is removable by sliding it in a groove 5 provided in a partition wall 6 of the apparatus. This partition wall defines a second chamber 7 which is open in front of the comb and through which is sprayed from a spraying distributor tube 8 in a direction onto the comb and onto the coat or fur, spread apart by the latter, a mist of cleaning or treating product. The distributor tube 8 is also removable to enable a choice of a correct diameter of the spraying apertures. Its end portion is bent so that its end 9 can be fitted onto the valve of a container 10 of treating product under pressure inserted in a third chamber 11 of the housing. The other end of the container 10 extends out of the housing in the vicinity of the handle 2 so that a pressure exerted by the fingers on the end of the container containing the product under pressure permits the opening of the valve and the spraying of the treating product in the direction of the coat or fur. A boss 12 enables the apparatus to be laid on the animal and moderates the penetration of the comb in the coat. The suction of air from the chamber 3 occurs through openings 13, 14, 15 located on each side of brushes 16 and 17 inserted in a slideway 18 and also interchangeable by sliding them in this slideway. The fineness and the stiffness of these brushes are chosen in accordance with the work to be carried out and the type of coat to be attended to.

Figure 3:
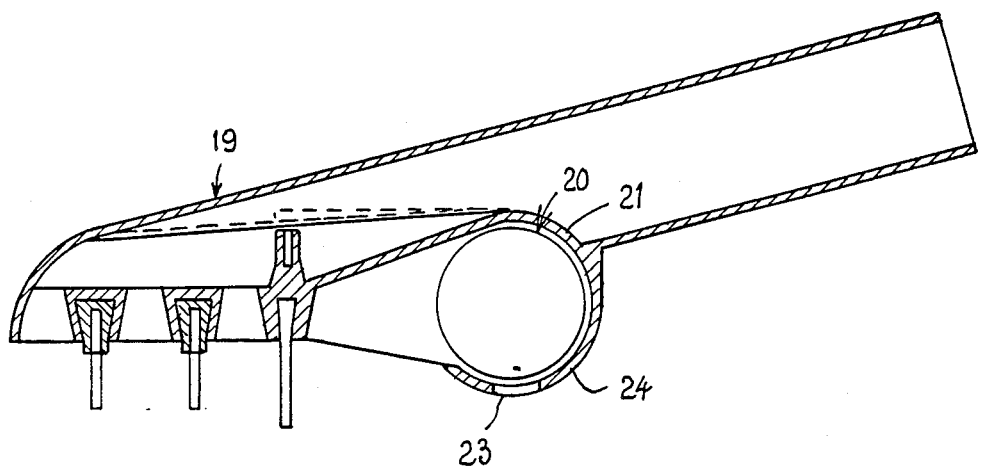
FIG. 3 is a similar sectional view of a second embodiment of an apparatus according to the invention.

According to another embodiment of an apparatus according to the invention, shown in FIG. 3, this apparatus also comprises a housing 19 and, instead of the product-spraying device described with reference to FIGS. 1 and 2, a cartridge or canister 20 of product in the form of a powder or a gel including a number of openings is disposed in a third chamber 21 of the apparatus, this chamber being for example open through a second chamber in the direction of the comb. According to one embodiment, the openings of the cartridge 20 are disposed in facing relation to an opening 23 provided in wall 24 of the chamber 21 to permit the distribution of the treating product in the direction of the hairs and the brushes.

It is also possible to insert in this chamber a cartridge of solidified gel of treating product, the opening in the direction of the combs then permitting, under the effect of the suction, the distribution of the molecules contained in the gel in the direction of the hairs.

The other parts of this embodiment are identical to those described with reference to the first embodiment (FIGS. 1 and 2) and need not be described again in detail.

What is claimed is:

1. An apparatus for use in the care of the coat of an animal, said apparatus comprising:
    a hollow housing having therein a suction first chamber, said housing having integral therewith a connector forming a handle for connecting said first chamber to a suction device;
    a comb carried by said housing;
    a partition within said housing and defining second and third chambers separated from said first chamber, said second and third chambers being disposed on a side of said housing adjacent the side thereof carrying said comb; and
    means, disposed in said third chamber, for distributing a treating product through said second chamber in a direction toward said comb.

2. An apparatus as claimed in claim 1, wherein said distributing means comprises a spray device for spraying the treating product toward said comb.

3. An apparatus as claimed in claim 2, wherein said spray device comprises a distributor tube having a plurality of orifices.

4. An apparatus as claimed in claim 3, wherein said spray device further comprises a tank containing the treating product under pressure and having a valve to which is connected an end of said distributor tube.

5. An apparatus as claimed in claim 1, wherein said distributing means comprises a cartridge containing the treating product as a powder.

6. An apparatus as claimed in claim 5, wherein said third chamber is defined by a wall having therein an opening, and said cartridge has orifices facing said opening to permit further distribution of the treating product therethrough toward the coat of the animal.

7. An apparatus as claimed in claim 1, wherein said distributing means comprises a cartridge containing the treating product as a gel.

8. An apparatus as claimed in claim 7, wherein said third chamber is defined by a wall having therein an opening, and said cartridge has orifices facing said opening to permit further distribution of the treating product therethrough toward the coat of the animal.

9. An apparatus as claimed in claim 1, further comprising at least one brush carried by said housing at a position on a side of said comb opposite said second chamber and within a stream of air suctioned through said first chamber by the suction device.

10. An apparatus as claimed in claim 1, wherein said housing has thereon a boss to be positioned on the coat of the animal to enable control of the extent of penetration thereinto of said comb.

* * * * *